C. P. FUNK.
DETACHABLE BOOT FOR AUTOMOBILE TIRES.
APPLICATION FILED JULY 21, 1914.
1,133,718.  Patented Mar. 30, 1915.
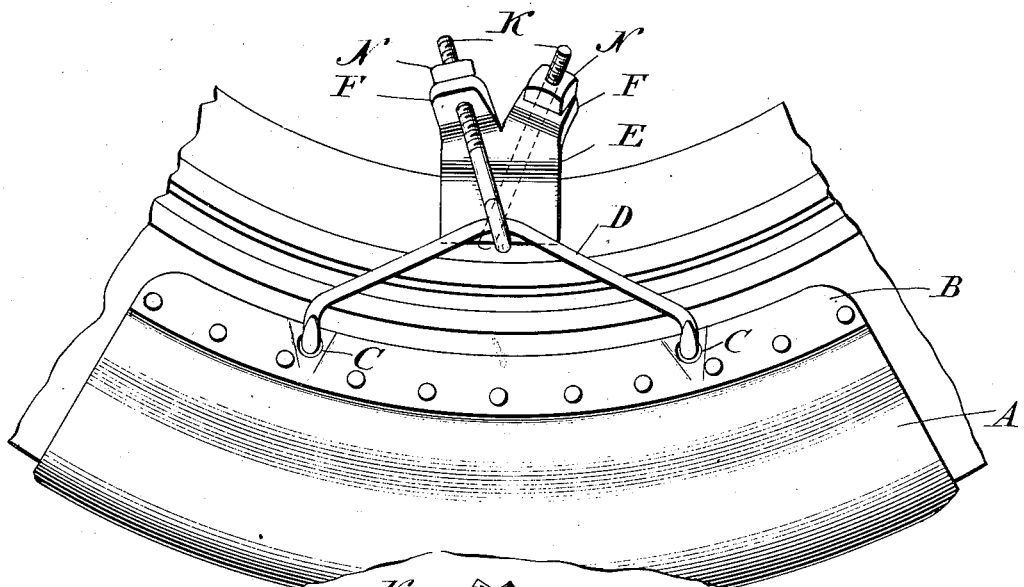
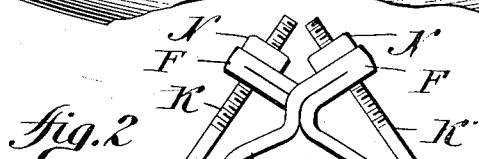
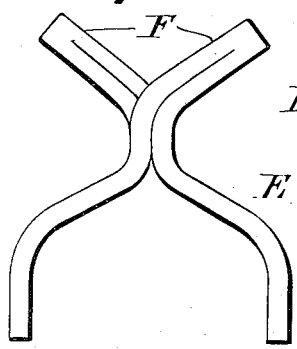
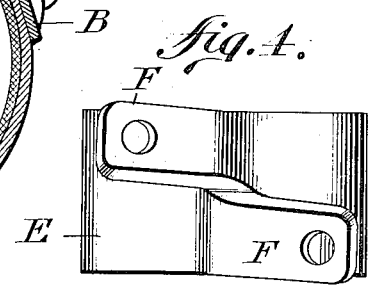

UNITED STATES PATENT OFFICE.

CAPTAIN P. FUNK, OF WOOSTER, OHIO.

DETACHABLE BOOT FOR AUTOMOBILE-TIRES.

1,133,718.  Specification of Letters Patent.  Patented Mar. 30, 1915.

Application filed July 21, 1914.  Serial No. 852,230.

*To all whom it may concern:*

Be it known that I, CAPTAIN P. FUNK, a citizen of the United States, residing at Wooster, in the county of Wayne and State of Ohio, have invented certain new and useful Improvements in Detachable Boots for Automobile-Tires; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in detachable boots for use upon automobile tires in the event of a blow out or other injury to the tire.

The invention consists of a simple and efficient device of this nature which may be easily and quickly applied to the felly and providing means for holding the boot over the injured part of the tire as a temporary bandage or repair therefor.

The invention comprises various details of construction, combinations and arrangements of parts which will be hereinafter fully described, shown in the accompanying drawings and then specifically defined in the appended claim.

I illustrate my invention in the accompanying drawings, in which:—

Figure 1 is a side elevation showing the application of my device to the tire. Fig. 2 is a cross sectional view. Fig. 3 is an enlarged detail edge elevation of a felly clamp, and Fig. 4 is a top plan view of the clamp.

Reference now being had to the details of the drawings by letter, A designates a boot which may be of any suitable material and size and adapted to fit over the blow out or injured part of the tire. Along the marginal edges of the boot are metallic strips B, apertured at C. D designate bail-shaped members, the ends of which engage said apertures and which members are oppositely disposed. E designates a felly clamp, made preferably of the shape shown in the detail views of the drawings and having a concaved portion adapted to fit over the felly and laterally projecting, inclined, integral lugs F, which are apertured for the reception of the eye bolts K, the eyes of which are fastened one to each bail-shaped member. Nuts N are fitted to the threaded portions of said bolts and serve as means for drawing the parts tightly together, causing the boot to frictionally clamp the outer surface of the tire over and adjacent to its injured portion.

In applying the device, one of the nuts is removed and the felly clamp adjusted in place, after which the bolt is returned to its proper place through the aperture in the clamp plate and the nut applied, after which the parts are drawn and securely held in the manner shown in Fig. 1.

By the provision of a protecting boot as shown, it will be noted that a simple and efficient means is afforded whereby the device may be easily and quickly applied to the tire in an emergency and securely hold the parts about the blow out portion of the tire.

What I claim to be new is:—

A quick detachable boot for automobile tires comprising a plate bent upon itself and forming two curved felly engaging arms, the shank portions which are bent upon themselves being bent outwardly in opposite directions forming two arms with a V-shaped space intermediate the same, said arms being apertured, eye bolts having threaded portions passing through said apertures and adapted to be positioned one upon either side of the plate and at an angle to each other, a boot, metallic strips secured to the marginal edges thereof, and connections between said strips and the eyes of the bolts.

In testimony whereof I hereunto affix my signature in presence of two witnesses.

CAPTAIN P. FUNK.

Witnesses:
 Ross W. FUNCK,
 GRACE WILE.